US012343795B2

(12) United States Patent
Boll et al.

(10) Patent No.: US 12,343,795 B2
(45) Date of Patent: Jul. 1, 2025

(54) METHOD FOR PRODUCING A CATALYST SYSTEM FOR GAS REACTIONS

(71) Applicant: Heraeus Deutschland GmbH & Co. KG, Hanau (DE)

(72) Inventors: Willi Boll, Hanau (DE); Stephan Humm, Hanau (DE); Peter Hubert, Hanau (DE); Pascal Hirschel, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 664 days.

(21) Appl. No.: 17/754,971

(22) PCT Filed: Aug. 31, 2020

(86) PCT No.: PCT/EP2020/074173
§ 371 (c)(1),
(2) Date: Apr. 18, 2022

(87) PCT Pub. No.: WO2021/078429
PCT Pub. Date: Apr. 29, 2021

(65) Prior Publication Data
US 2022/0387977 A1 Dec. 8, 2022

(30) Foreign Application Priority Data
Oct. 21, 2019 (EP) .................... 19204249

(51) Int. Cl.
| | | |
|---|---|---|
| *B01J 23/44* | (2006.01) | |
| *B01J 23/89* | (2006.01) | |
| *B01J 35/58* | (2024.01) | |
| *B22F 1/052* | (2022.01) | |
| *B22F 1/065* | (2022.01) | |
| *B22F 9/08* | (2006.01) | |
| *B22F 10/20* | (2021.01) | |
| *B22F 10/28* | (2021.01) | |
| *B33Y 10/00* | (2015.01) | |
| *B33Y 70/00* | (2020.01) | |
| *B33Y 80/00* | (2015.01) | |
| *B01J 35/40* | (2024.01) | |
| *B01J 35/61* | (2024.01) | |
| *B22F 10/60* | (2021.01) | |
| *B22F 10/73* | (2021.01) | |
| *B22F 12/41* | (2021.01) | |

(52) U.S. Cl.
CPC ............. *B22F 10/20* (2021.01); *B01J 23/44* (2013.01); *B01J 23/8993* (2013.01); *B01J 35/58* (2024.01); *B22F 1/052* (2022.01); *B22F 1/065* (2022.01); *B22F 9/08* (2013.01); *B22F 10/28* (2021.01); *B33Y 10/00* (2014.12); *B33Y 70/00* (2014.12); *B33Y 80/00* (2014.12); *B01J 35/40* (2024.01); *B01J 35/612* (2024.01); *B22F 10/60* (2021.01); *B22F 10/73* (2021.01); *B22F 12/41* (2021.01); *B22F 2301/25* (2013.01)

(58) Field of Classification Search
CPC ........ B01J 23/44; B01J 24/8993; B01J 35/58; B22F 10/20; B22F 10/28; B22F 1/052; B22F 1/065; B22F 9/08; B33Y 10/00; B33Y 70/00; B33Y 80/00
USPC ......................................... 502/332–334, 339
See application file for complete search history.

(56) References Cited

U.S. PATENT DOCUMENTS

| | | | |
|---|---|---|---|
| 9,757,720 B2 * | 9/2017 | Lukas ................. C01B 21/265 |
| 10,744,590 B2 * | 8/2020 | Maier .................... B22F 1/052 |
| 2017/0252854 A1 * | 9/2017 | Maier .................... B22F 1/052 |
| 2018/0333704 A1 | 11/2018 | Ide et al. | |

FOREIGN PATENT DOCUMENTS

| | | |
|---|---|---|
| DE | 60201502 T2 | 11/2005 |
| EP | 0504723 A1 | 9/1992 |
| EP | 3216545 A1 | 9/2017 |
| WO | 2012032325 A1 | 3/2012 |

* cited by examiner

*Primary Examiner* — Cam N. Nguyen
(74) *Attorney, Agent, or Firm* — Blank Rome LLP

(57) ABSTRACT

A method for producing a catalyst system for gas reactions comprising at least one planar structure of noble metal having gas-permeable openings, comprising the steps of:
(1) providing at least one noble metal powder consisting of at least substantially spherical noble metal particles, and
(2) repeatedly applying the noble metal powder or powders provided in step (1) in layers to a substrate in a build chamber, respectively followed by an at least partial melting of the respective noble metal powder applied as a layer with high-energy radiation, and allowing the melted noble metal powder to solidify within the scope of additive manufacturing.

21 Claims, No Drawings ated design data, the powder is at least partially melted via
METHOD FOR PRODUCING A CATALYST SYSTEM FOR GAS REACTIONS The invention relates to a method for producing a catalyst system for gas reactions.

WO 2012/032325 A1 discloses the production of a catalyst by means of additive manufacturing. In one of the disclosed embodiments, the catalyst can be additively manufactured from noble metal powder.

The term "additive manufacturing" is used herein. Components with complex three-dimensional geometry can be produced directly via additive manufacturing methods. "Additive manufacturing" refers to a process in which a component is constructed on the basis of digital 3D design data by depositing powdered material in layers. Examples of additive manufacturing methods known to those skilled in the art are selective laser sintering (SLS), selective laser melting (SLM), selective electron beam melting. Usually, a thin layer of the powder material is first applied on a build platform. At the locations specified by the computer-generated design data, the powder is at least partially melted via a sufficiently high energy input, for example in the form of a laser or electron beam. The build platform is then lowered, and more powder is applied. The further powder layer is again at least partially melted and bonds to the underlying layer at the defined locations. These steps are repeated until the component is present in its final form.

Based on WO 2012/032325 A1 as the closest prior art, the object of the invention is to develop a method which allows a flexible production of a noble metal catalyst system for gas reactions.

The term "gas reactions" used herein refers to chemical reactions between gaseous reactants to form one or more gaseous reaction products. In connection with the method according to the invention, the term "gas reactions" refers in particular to the preparation of hydrocyanic acid according to the Andrussow process and to the preparation of nitrogen oxide according to the Ostwald process. In the Andrussow process, methane, ammonia, and oxygen are converted to hydrocyanic acid, whereas in the Ostwald process, ammonia is oxidized with oxygen to give nitrogen oxide, which is used in nitric acid production. Both processes are heterogeneous noble metal-catalyzed gas reactions. The unburnt gas is thereby conducted through a catalyst system, comprising catalyst nets arranged in series, orthogonal to its direction of flow, and reacts upon passing through the net meshes to form the target products hydrocyanic acid and nitrogen oxide. The catalyst nets consist of single-layer or multi-layer knitted fabrics, stitched fabrics, or woven fabrics made of fine noble metal wires.

The invention relates to a method for producing a catalyst system for gas reactions, comprising at least one planar structure of noble metal having gas-permeable openings, comprising the steps of:
(1) providing at least one noble metal powder consisting of at least substantially spherical noble metal particles, and
(2) repeatedly applying the noble metal powder or powders provided in step (1) in layers to a substrate in a build chamber, respectively followed by an at least partial melting of the respective noble metal powder applied as a layer with high-energy radiation, and allowing the melted noble metal powder to solidify within the scope of additive manufacturing,
wherein the or every planar structure of noble metal comprising gas-permeable openings has an individual weight per unit area in the range of 25 to 2500 g/m², wherein the noble metal particles of the noble metal powder or powders have a particle size distribution with a $d_{10}$ value of ≥5 μm and a $d_{90}$ value of ≤80 μm, and wherein the noble metal of the noble metal particles of the noble metal powder or powders is selected from the group consisting of noble metal alloys of platinum with 1-15 wt. % (percentage by weight) rhodium,
platinum with 2-15 wt. % rhodium and 0.1-20 wt. % palladium,
platinum with 2-15 wt. % rhodium, 0.1-20 wt. % palladium, and 0.1-2 wt. % ruthenium,
platinum with 2-15 wt. % rhodium, 0.1-20 wt. % palladium, and 0.1-5 wt. % iridium,
palladium with 3-15 wt. % platinum,
palladium with 1-20 wt. % platinum and 1-10 wt. % rhodium,
palladium with 1-25 wt. % tungsten, and
palladium with 1-15 wt. % nickel.

In step (1) of the method according to the invention, at least one noble metal powder is provided. If more than one noble metal powder is provided, this means that the provided noble metal powders respectively differ from one another in terms of the type of their alloy composition and/or in terms of their particle size distribution.

It is essential that the noble metal particles of the noble metal powder or powders provided in step (1) are at least substantially spherical.

In a first approximation, the ratio of its minimum diameter $d_{min}$ to its maximum diameter $d_{max}$ can be regarded as a measure of the sphericity of a particle. The closer this value is to 1.0, the higher the sphericity of the particle.

Accordingly, relative to their number, preferably at least 80%, more preferably at least 90%, and in particular 99 to 100% of the noble metal particles satisfy the following condition:

$$0.8 \le d_{min}/d_{max} \le 1.0;$$

wherein $d_{min}$ is the minimum diameter and $d_{max}$ is the maximum diameter of an individual noble metal particle.

Suitable methods for the production of at least substantially spherical noble metal particles are known in principle to the person skilled in the art. The production of the powder made of noble metal particles or, respectively, of the noble metal particles preferably takes place via an atomization method, in particular gas atomization (e.g., using nitrogen or a noble gas such as argon or helium as an atomization gas), plasma atomization, centrifugal atomization, or containerless atomization (e.g., a method referred to as a "rotating electrode" process (REP), in particular a "plasma rotating electrode" process (PREP)). A further exemplary method is the EIGA ("electrode induction-melting gas atomization") process, inductive melting of the starting material in the form of an applicable one of the aforementioned noble metal alloys and subsequent gas atomization.

During gas atomization, the starting material is melted under an air or protective gas bell or in a vacuum. The chamber is then filled with gas in order to drive the melted noble metal through the nozzle, where an atomization gas (for example, nitrogen or a noble gas, such as helium or argon) impinges on the flowing melt at high velocity and breaks it up. At least substantially spherical noble metal droplets are created which then solidify into at least substantially spherical precious metal particles.

In plasma atomization, the starting material is supplied to a plasma torch which atomizes the noble metal powder with the aid of a gas.

In centrifugal atomization, melt droplets are hurled away from a rotating source and solidify to at least substantially spherical noble metal particles.

In containerless atomization using a rotating electrode ("REP"), a noble metal rod rotates at a high rotational speed, wherein its free end is gradually melted, for example by an electron beam, an arc, or a plasma. Melt droplets are hurled away from the rotating noble metal rod and solidify into at least substantially spherical noble metal particles. The noble metal rod can thereby rotate about a horizontal axis or about a vertical axis.

The atomization preferably takes place with an inert gas (e.g., nitrogen or a noble gas, such as argon).

The atomization preferably takes place with the exclusion of oxygen, or at least in the presence of only very small amounts of oxygen. It is therefore preferred that less than 5 vol. ppm of oxygen is present in the gas volume during atomization.

It is further essential that the at least substantially spherical noble metal particles of the noble metal powder or powders have a particle size distribution with a $d_{10}$ value of ≥5 μm and a $d_{90}$ value of ≤80 μm. The $d_{50}$ value preferably lies in the range of 20 to 30 μm. In the context of the present invention, the particle size distribution in the form of a mass distribution cumulative curve is determined by laser diffraction.

In a preferred embodiment, the $d_{10}$ value is ≥10 μm, in particular in the range of ≥10 μm to ≤20 μm, and the $d_{90}$ value is ≤45 μm, in particular in the range of ≥30 μm to ≤45 μm.

In order to obtain a particle size distribution with said defined $d_{10}$ and $d_{90}$ values, the noble metal particles obtained via atomization may subsequently be subjected to a sorting process, such as screening, air separation, or centrifuging.

Two or more of these sorting methods can also be connected in series in order to achieve an optimally precise adjustment of the particle size distribution. For example, one or more screenings and subsequently one or more air separations can initially be performed.

As already mentioned, the noble metal of the noble metal particles of the noble metal powder or powders is selected from the group consisting of alloys of
platinum with 1-15 wt. % rhodium,
platinum with 2-15 wt. % rhodium and 0.1-20 wt. % palladium,
platinum with 2-15 wt. % rhodium, 0.1-20 wt. % palladium, and 0.1-2 wt. % ruthenium,
platinum with 2-15 wt. % rhodium, 0.1-20 wt. % palladium, and 0.1-5 wt. % iridium,
palladium with 3-15 wt. % platinum,
palladium with 1-20 wt. % platinum and 1-10 wt. % rhodium,
palladium with 1-25 wt. % tungsten, and
palladium with 1-15 wt. % nickel.

In one embodiment of the method according to the invention, only one noble metal powder or, respectively, only one type of noble metal powder is provided in step (1), and the catalyst system is consequently manufactured additively from a single noble metal alloy. In this embodiment, unmelted noble metal powder can be recovered according to type and, if applicable, be reused directly. Here, the catalyst system produced via additive manufacturing in the method according to the invention consists of the corresponding noble metal alloy.

In other embodiments of the method according to the invention, several types of noble metal powder which differ from one another with respect to the alloy composition are provided in step (1), and the catalyst system is consequently manufactured additively from several different of the aforementioned metal alloys, or consists thereof after completion of additive manufacturing. Here, unmelted noble metal powder is not recovered according to type, i.e., but as a mixture of different noble metal powders which can be supplied to conventional noble metal recycling. Here, the catalyst system produced by additive manufacturing in the method according to the invention consists partially of a first noble metal alloy and partially of at least one noble metal alloy differing therefrom. This may mean, for example, that the catalyst system comprises multiple planar structures of noble metal having multiple gas-permeable openings, wherein the individual planar structures of noble metal do not all consist of the same noble metal alloy. For example, the individual planar structures of noble metal may consist at least partially of noble metal alloys that differ from one another, for example respectively of a different noble metal alloy. Different noble metal alloys may also be processed within a single planar structure of noble metal.

The actual additive manufacturing takes place during step (2), in particular as a 3D printing method. Digital 3D design data of the catalyst system are hereby used, for example in the form of CAD data or data formats of the relevant 3D printing system manufacturer. Various structural features of the catalyst system or, respectively, of the planar structures of noble metal comprised thereof and having at least one gas-permeable opening can be determined via the selection of the digital 3D design data, as will be explained subsequently.

In step (2), the noble metal powder or powders provided in step (1) are repeatedly applied in layers to a substrate in a build chamber, respectively followed by at least a partial melting of the respective noble metal powder applied as a layer with high-energy radiation and allowing the melted noble metal powder to solidify within the scope of an additive manufacturing. The number of repetitions naturally depends on the type and size of the catalyst system to be produced in the method according to the invention.

Usually, the build chamber is first evacuated or filled with an inert gas (for example, nitrogen or a noble gas).

The high-energy radiation can be laser or electron beams, for example. In particular, near-infrared lasers with a wavelength in the range of 1040 to 1080 nm are suitable as lasers. A 3D laser printer is preferably used; its laser spot can expediently have a diameter in the range of 10 μm to 150 μm.

At the end of the process, free or loose unmelted noble metal powder can be removed from the component, i.e. from the catalyst system.

In the method according to the invention, a catalyst system for gas reactions comprising at least one planar structure of noble metal having gas-permeable openings is produced. The catalyst system for gas reactions may comprise or consist of one planar structure of noble metal, a plurality of identical planar structures of noble metal, or a plurality of different planar structures of noble metal. "A plurality of different planar structures of noble metal" may mean that variability exists in the type of noble metal alloys and/or in structural features. The one planar structure of noble metal, the plurality of identical planar structures of noble metal, or the plurality of different planar structures of noble metal may constitute a complete catalyst system for gas reactions, or a catalyst subsystem in the sense of a part of a complete catalyst system for gas reactions. For example, it may be a single net layer or a net package of two or more net layers, for example up to 40 net layers.

The individual planar structure of noble metal or planar structures produced as a catalyst system or part thereof in the method according to the invention have a weight by unit area in the range of 25 to 2500 g/m² or in the range of 75 to 1000 g/m², for example.

A planar structure of noble metal having gas-permeable openings within the meaning of the present invention may, for example, respectively be planar (non-curved) objects, such as grids, perforated plates, screens, or preferably nets (individual net layers). The planar structure of noble metal may have a superficial extent of up to several square meters, for example in the range of 0.25 to 35 square meters; if circular in shape, the diameter of the planar structure of noble metal may be up to 6.5 meters, for example. When the planar structure of noble metal is viewed from above, the entirety of the gas-permeable openings within a single planar structure of noble metal usually forms a uniform, regularly repeating pattern. Likewise, when the planar structure of noble metal is viewed from above, adjacent gas-permeable openings or net meshes have a uniform or variable edge distance formed by the noble metal, for example in the range of 30 to 200 μm. In each instance, when the planar structure of noble metal is viewed from above, patterns, edge distance, size, and also the shape of the openings are structural features which can be determined by the selection of aforementioned digital 3D design data.

In a preferred embodiment of a planar structure of noble metal in the form of a net having gas-permeable openings produced by the method according to the invention, said planar structure of noble metal may have, for example, a structure akin to a woven fabric, or a weft or warp knitted fabric. In particular, the nets thereby represent the gas-permeable openings. The structure of the net can thereby be as if it were based on wire with a round cross-sectional shape, i.e. a round wire. However, it is also possible to design the structure of the net as if it were based on wire with a cross-sectional shape that is other than round, i.e., for example, elliptical, rectangular, square, or hexagonal. Independently of the cross-sectional shape, the wire cross-sectional area can, for example, be in the range of 400 to 22500 μm². In the event of round wire, the cross-section can be determined by a diameter, for example, in the range of 30 μm to 150 μm; for example, the instance of a round wire having a diameter of 30 μm corresponds to a weight by unit area at the lower end of the aforementioned ranges of 25 to 2500 g/m² or of 75 to 1000 g/m², respectively. Both the type of net structure, the cross-sectional shape, and the cross-sectional area are structural features that can be determined by the selection of the digital 3D design data. For example, a net structure can also be created as if it were based not only on one wire type but rather on two or more wires respectively having different cross-sections with respect to cross-sectional shape and/or cross-sectional area.

Furthermore, within the context of additive manufacturing, the selection of digital 3D design data can influence properties such as surface roughness, porosity, and/or solidity of the noble metal material of the planar structure of noble metal or planar structures having gas-permeable openings. The surface of the noble metal material may thus be more or less rough; the noble metal material may be pore-free or more or less porous. As of a certain cross-section of the noble metal material, the latter may also be hollow on the inside.

As follows from the aforementioned, the method according to the invention allows a flexible production of a catalyst system for gas reactions comprising at least one planar structure of noble metal having gas-permeable openings, optionally having structural features which cannot be realized by means of conventional production methods of the prior art (knitting, interlacing, weaving). For example, a structure optimized in terms of flow mechanics can be produced.

It is particularly to be emphasized that the method according to the invention also makes it possible to realize a highly catalytically active surface of a relevant catalyst system with, at the same time, minimal use of noble metal, if so desired. In addition to the aforementioned influence on aforementioned structural features of the catalyst system, the digital 3D design data used in step (2) within the framework of actual additive manufacturing can be selected such that a catalyst system with an economically efficient ratio of noble metal use to highly catalytically active surface is developed. In other words, a savings of noble metal can be achieved as compared to the production of a corresponding catalyst system by means of conventional production methods of the prior art (weft knitting, warp knitting, weaving).

Exemplary Embodiment

To produce a catalyst system according to the invention, a noble metal powder comprising PtRh5 was used. The powder was produced by inductive melting of the starting material and gas atomization (EIGA "electrode induction-melting gas atomization") using argon as an inert gas. Spherical particles were obtained. The obtained noble metal powder was sorted by screening (Retsch AS 200).

The particle size distribution in the form of a mass distribution cumulative curve was determined by laser diffraction. The sorted powder had a $d_{10}$ of 12.6 μm, a $d_{50}$ of 24.1 μm, and a $d_{90}$ value of 42.3 μm.

A circular shaped catalyst system, consisting of 6 net planes having gas-permeable rectangular openings of the dimensions 405 μm–145 μm and formed by 120 μm-wide webs, was produced from said powder in an additive manufacturing process by selective laser melting at a system of the company Trumpf, model T1000. The dimensions were determined using REM images. The 6 net planes were connected to one another via webs. The weight by unit area of each individual layer corresponded to 955 g/m2.

The invention claimed is:

1. A method for producing a catalyst system for gas reactions comprising at least one planar structure of noble metal having gas-permeable openings, comprising the steps of:
   (1) providing at least one noble metal powder consisting of metal particles, wherein at least 80% of the noble metal particles, relative to their number, satisfy the condition $0.8 \leq d_{min}/d_{max} \leq 1.0$, wherein $d_{min}$ is the minimum diameter and $d_{max}$ is the maximum diameter of an individual noble metal particle, and
   (2) repeatedly applying the noble metal powder or powders provided in step (1) in layers to a substrate in a build chamber, respectively followed by an at least partial melting of the respective noble metal powder applied as a layer with radiation in the form of a laser or electron beam, and allowing the melted noble metal powder to solidify as part of an additive manufacturing process, wherein the at least one planar structure of noble metal comprising gas-permeable openings has an individual weight per unit area in the range of 25 to 2500 g/m$^2$, wherein the noble metal particles of the noble metal powder or powders have a particle size distribution with a $d_{10}$ value of ≥5 μm and a $d_{90}$ value of ≤80 μm, wherein the noble metal of the noble metal particles of the noble metal powder or powders is selected from the group consisting of noble metal alloys of platinum with 1-15 wt. % rhodium, platinum with 2-15 wt. % rhodium and 0.1-20 wt. % palladium, platinum with 2-15 wt. % rhodium, 0.1-20 wt. % palladium, and 0.1-2 wt. % ruthenium, platinum with 2-15 wt. % rhodium, 0.1-20 wt. % palladium, and 0.1-5 wt. % iridium, palladium with 1-20 wt. % platinum and 1-10 wt. % rhodium, palladium with 1-25 wt. % tungsten, and palladium with 1-15 wt. % nickel, and wherein the at least one planar structure of noble metal is a planar object selected from the group consisting of grids, perforated plates, screens, and nets.

2. The method of claim 1, wherein the noble metal particles are produced by an atomization process.

3. The method of claim 1, wherein the $d_{50}$ value of the particle size distribution is in the range from 20 to 30 μm.

4. The method of claim 1, wherein the $d_{10}$ value is ≥10 μm and the $d_{90}$ value is ≤45 μm.

5. The method according to Claim of claim 4, wherein the $d_{10}$ value is in the range of ≥10 μm to ≤20 μm, and the $d_{90}$ value is in the range of ≥30 μm to ≤45 μm.

6. The method of claim 1, wherein the catalyst system comprises or consists of one planar structure of noble metal, a plurality of identical planar structures of noble metal, or a plurality of different planar structures of noble metal, and wherein the one planar structure of noble metal, the plurality of identical planar structures of noble metal, or the plurality of different planar structures of noble metal constitute a complete catalyst system for gas reactions or a catalyst subsystem in the sense of a part of a complete catalyst system for gas reactions.

7. The method of claim 1, wherein the at least one planar structure of noble metal has a surface area in the range of 0.25 to 35 square meters.

8. The method of claim 1, wherein the net or nets at least one planar structure of noble metal is a net with a structure akin to a woven fabric, a weft knitted fabric, or a warp knitted fabric.

9. The method of claim 8, wherein the structure of the net is as if it were based on round wire and/or on wire with a cross-sectional shape other than round.

10. The method of claim 9, wherein, independently of the cross-sectional shape, the wire cross-sectional area ranges from 400 to 22500 μm$^2$.

11. The method of claim 1, wherein the selection of digital 3D design data within the context of additive manufacturing influences surface roughness, porosity, and/or solidity of the noble metal material of the noble metal planar structure.

12. A method for producing a catalyst system for gas reactions comprising at least one planar structure of noble metal having gas-permeable openings, comprising the steps of:

(1) providing at least one noble metal powder consisting of metal particles, wherein at least 80% of the noble metal particles, relative to their number, satisfy the condition 0.823 $d_{min}/d_{max}$≤1.0, wherein $d_{min}$ is the minimum diameter and $d_{max}$ is the maximum diameter of an individual noble metal particle, and (2) repeatedly applying the noble metal powder or powders provided in step (1) in layers to a substrate in a build chamber, respectively followed by an at least partial melting of the respective noble metal powder applied as a layer with radiation in the form of a laser or electron beam, and allowing the melted noble metal powder to solidify as part of an additive manufacturing process, wherein the at least one planar structure of noble metal comprising gas-permeable openings has an individual weight per unit area in the range of 25 to 2500 g/m$^2$, wherein the noble metal particles of the noble metal powder or powders have a particle size distribution with a $d_{10}$ value of ≥5 μm, a $d_{50}$ value in the range of 20 to 30 μm, and a $d_{90}$ value of ≤80 μm, and wherein the noble metal of the noble metal particles of the noble metal powder or powders is selected from the group consisting of noble metal alloys of platinum with 1-15 wt. % rhodium, platinum with 2-15 wt. % rhodium and 0.1-20 wt. % palladium, platinum with 2-15 wt. % rhodium, 0.1-20 wt. % palladium, and 0.1-2 wt. % ruthenium, platinum with 2-15 wt. % rhodium, 0.1-20 wt. % palladium, and 0.1-5 wt. % iridium, palladium with 3-15 wt. % platinum, palladium with 1-20 wt. % platinum and 1-10 wt. % rhodium, palladium with 1-25 wt. % tungsten, and palladium with 1-15 wt. % nickel.

13. The method of claim 12, wherein the noble metal particles are produced by an atomization process.

14. The method of claim 12, wherein the $d_{10}$ value is ≥10 μm and the $d_{90}$ value is ≤45 μm.

15. The method of claim 14, wherein the $d_{10}$ value is in the range of ≥10 μm to ≤20 μm, and the $d_{90}$ value is in the range of ≥30 μm to ≤45 μm.

16. The method of claim 12, wherein the catalyst system comprises or consists of one planar structure of noble metal, a plurality of identical planar structures of noble metal, or a plurality of different planar structures of noble metal, and wherein the one planar structure of noble metal, the plurality of identical planar structures of noble metal, or the plurality of different planar structures of noble metal constitute a complete catalyst system for gas reactions or a catalyst subsystem in the sense of a part of a complete catalyst system for gas reactions.

17. The method of claim 12, wherein the at least one planar structure of noble metal is a planar object selected from the group consisting of grids, perforated plates, screens, and nets.

18. The method of claim 12, wherein the at least one planar structure of noble metal has a surface area in the range of 0.25 to 35 square meters.

19. The method of claim 12, wherein the selection of digital 3D design data within the context of additive manufacturing influences surface roughness, porosity, and/or solidity of the noble metal material of the noble metal planar structure.

20. The method of claim 12, wherein the noble metal particles of the noble metal powder or powders have a $d_{50}$ value in the range of 20 to 30 μm.

21. A method for producing a catalyst system for gas reactions comprising at least one planar structure of noble metal having gas-permeable openings, comprising the steps of:
  (1) providing at least one noble metal powder consisting of metal particles, wherein at least 80% of the noble metal particles, relative to their number, satisfy the condition $0.8 \leq d_{min}/d_{max} \leq 1.0$, wherein $d_{min}$ is the minimum diameter and $d_{max}$ is the maximum diameter of an individual noble metal particle, and
  (2) repeatedly applying the noble metal powder or powders provided in step (1) in layers to a substrate in a build chamber, respectively followed by an at least partial melting of the respective noble metal powder applied as a layer with radiation in the form of a laser or electron beam, and allowing the melted noble metal powder to solidify as part of an additive manufacturing process,
    wherein the at least one planar structure of noble metal comprising gas-permeable openings has an individual weight per unit area in the range of 25 to 2500 g/m² and a surface area in the range of 0.25 to 35 square meters,
    wherein the noble metal particles of the noble metal powder or powders have a particle size distribution with a $d_{10}$ value of $\geq 5$ µm and a $d_{90}$ value of $\leq 80$ µm,
  and wherein the noble metal of the noble metal particles of the noble metal powder or powders is selected from the group consisting of noble metal alloys of platinum with 1-15 wt. % rhodium, platinum with 2-15 wt. % rhodium and 0.1-20 wt. % palladium, platinum with 2-15 wt. % rhodium, 0.1-20 wt. % palladium, and 0.1-2 wt. % ruthenium, platinum with 2-15 wt. % rhodium, 0.1-20 wt. % palladium, and 0.1-5 wt. % iridium, palladium with 3-15 wt. % platinum, palladium with 1-20 wt. % platinum and 1-10 wt. % rhodium, palladium with 1-25 wt. % tungsten, and palladium with 1-15 wt. % nickel.

* * * * *